(12) United States Patent
Schulze Isfort et al.

(10) Patent No.: US 9,963,354 B2
(45) Date of Patent: May 8, 2018

(54) PROCESS FOR PRODUCING METAL OXIDES

(71) Applicants: Christian Schulze Isfort, Kapellen (BE); Michael Hagemann, Kahl (DE)

(72) Inventors: Christian Schulze Isfort, Kapellen (BE); Michael Hagemann, Kahl (DE)

(73) Assignee: EVONIK DEGUSSA GmbH, Essen (DE)

( * ) Notice: Subject to any disclaimer, the term of this patent is extended or adjusted under 35 U.S.C. 154(b) by 139 days.

(21) Appl. No.: 14/890,566

(22) PCT Filed: Jun. 13, 2014

(86) PCT No.: PCT/EP2014/062300
§ 371 (c)(1),
(2) Date: Nov. 11, 2015

(87) PCT Pub. No.: WO2015/003871
PCT Pub. Date: Jan. 15, 2015

(65) Prior Publication Data
US 2016/0115042 A1 Apr. 28, 2016

(30) Foreign Application Priority Data
Jul. 11, 2013 (EP) .................................... 13176126

(51) Int. Cl.
*C01G 23/00* (2006.01)
*C01B 33/18* (2006.01)
(Continued)

(52) U.S. Cl.
CPC .............. *C01G 23/00* (2013.01); *C01B 13/24* (2013.01); *C01B 33/183* (2013.01); *C01B 33/26* (2013.01);
(Continued)

(58) Field of Classification Search
None
See application file for complete search history.

(56) References Cited

U.S. PATENT DOCUMENTS 3,363,980 A 1/1968 Krinov
3,663,283 A 5/1972 Hebert et al.
(Continued)

FOREIGN PATENT DOCUMENTS

CN 1736879 A 2/2006
CN 201848207 U 6/2011
(Continued)

OTHER PUBLICATIONS

International Search Report dated Sep. 17, 2014 for PCT/EP2014/062300 filed on Jun. 13, 2014.
(Continued)

*Primary Examiner* — Michael Forrest
(74) *Attorney, Agent, or Firm* — Oblon, McClelland, Maier & Neustadt, L.L.P.

(57) ABSTRACT

Method for producing a metal oxide powder in which
a) a material stream I containing at least one vaporous hydrolysable metal compound,
b) a material stream II containing oxygen and
c) a material stream III containing at least one fuel gas are brought to reaction, wherein
d) via a feed-in point provided in a pipe piece A, wherein the pipe piece A comprises one or more static mixer elements,
the material stream I is introduced into the material stream II, or vice versa, and thereby generates the material stream IV, then
e) via a feed-in point provided in a pipe piece B, wherein the pipe piece B comprises one or more static mixer elements, (Continued)

the material stream III is introduced into the material stream IV, and thereby generates the material stream V, f) the material stream V leaving the pipe piece B is introduced into a reaction chamber, ignited there and converted into a flame and g) the resultant solids are separated off.

14 Claims, 3 Drawing Sheets

(51) Int. Cl.
    *C01B 33/32*     (2006.01)
    *C01D 1/02*     (2006.01)
    *C01F 7/30*     (2006.01)
    *C01F 7/00*     (2006.01)
    *C01B 13/24*     (2006.01)
    *C01G 23/07*     (2006.01)
    *C01B 33/26*     (2006.01)

(52) U.S. Cl.
    CPC ............... *C01B 33/32* (2013.01); *C01D 1/02* (2013.01); *C01F 7/00* (2013.01); *C01F 7/302* (2013.01); *C01G 23/07* (2013.01); *C01P 2002/50* (2013.01); *C01P 2006/12* (2013.01)

(56) References Cited

U.S. PATENT DOCUMENTS

| | | |
|---|---|---|
| 5,451,390 A | 9/1995 | Hartmann et al. |
| 6,811,302 B2 * | 11/2004 | Fleischli ............... B01F 5/0616 366/174.1 |
| 7,658,907 B2 | 2/2010 | Schumacher et al. |
| 2004/0240062 A1 | 12/2004 | Lortz et al. |
| 2005/0095185 A1 * | 5/2005 | Gary ..................... B01F 3/02 422/224 |
| 2007/0144076 A1 * | 6/2007 | Schumacher ............ A61K 8/29 51/309 |

FOREIGN PATENT DOCUMENTS

| | | |
|---|---|---|
| DE | 2048 220 A1 | 4/1971 |
| DE | 102 10 189 A1 | 9/2003 |
| EP | 1 302 236 A1 | 4/2003 |
| JP | 51-55358 A | 5/1976 |
| JP | 6-191848 A | 7/1994 |
| JP | 2003-135945 A | 5/2003 |
| JP | 2005-504706 A | 2/2005 |
| JP | 2008-525294 A | 7/2008 |

OTHER PUBLICATIONS

European Search Report dated Nov. 25, 2013 for EP 13 17 6126.4 filed on Jul. 11, 2013.
U.S. Appl. No. 14/888,610, filed Nov. 2, 2015, Schulze Sfort, et al.

* cited by examiner

PROCESS FOR PRODUCING METAL OXIDES

The invention relates to a pyrogenic method for producing metal oxides, in which the input materials, prior to entry into a reaction chamber, are mixed by means of static mixer elements.

Flame hydrolysis has long been used for industrial production of metal oxides. In flame hydrolysis, generally a vaporous hydrolysable metal compound is brought to reaction by a flame which was formed by burning hydrogen and an oxygen-containing gas. The combustion flame in this case provides water for hydrolysing the metal compound and sufficient heat for the hydrolysis reaction. A metal oxide produced in this way is termed a pyrogenic metal oxide.

In the production of pyrogenic metal oxides by means of flame hydrolysis, the mixing of the reaction gases is of importance.

DE-A-1293728 discloses a method in which all of the gases fed are mixed prior to entry into the reaction zone, wherein the gas mixture is introduced into the narrow end of a conical reaction chamber. An embodiment is also disclosed in which a silane/air mixture and hydrogen are introduced tangentially into a cylindrical burner head. The impulse of these streams generates a rotation which is said to lead to a turbulent mixing of the reaction gases.

DE-A-3115002 discloses a mixing chamber which is said to generate a turbulent flow. In this case the reaction gases are conducted via two conduits into the mixing chamber. The burner tube is equipped with flow-correcting plates which are intended to ensure faultless combustion.

U.S. Pat. No. 3,363,980 likewise discloses a method for turbulent mixing of the reaction gases by means of mechanically moved stirrer paddles.

U.S. Pat. No. 2,990,249 discloses using, in addition to the reaction gases, an inert gas stream for the hydrolysis. For this purpose the inert gas is blown in through a ring slot which is arranged at the burner mouth and completely surrounds it.

DE-A-2702896 discloses inserting a porous diffusion component into the burner head. With this burner geometry, many small flames develop.

In WO2003/078321, a further multiburner type is disclosed. In this case, in a burner nozzle, metal chloride vapour and oxygen are mixed and hydrogen is conducted separately therefrom to the burner mouth.

The prior art shows that great importance is assigned to the mixing of the input materials in the case of flame hydrolysis. However, the proposed solutions are complex in terms of apparatus, are not very flexible in the case of fixed internals, and are susceptible to faults in the case of internals having moving parts.

Therefore, the technical problem of the present invention was to provide a method for producing pyrogenic metal oxides, which permits a constant homogeneous mixing of the input materials, is not very complex in terms of apparatus and susceptible to faults.

The invention relates to a method for producing a metal oxide powder, in which
a) a material stream I containing at least one vaporous hydrolysable metal compound,
b) a material stream II containing oxygen and
c) a material stream III containing at least one fuel gas are brought to reaction, wherein
d) via a feed-in point provided in a pipe piece A, wherein the pipe piece A comprises one or more static mixer elements,
the material stream I is introduced into the material stream II, or vice versa, and thereby generates the material stream IV, then
e) via a feed-in point provided in a pipe piece B, wherein the pipe piece B comprises one or more static mixer elements,
the material stream III is introduced into the material stream IV and thereby generates the material stream V,
f) the material stream V leaving the pipe piece B is introduced into a reaction chamber, ignited there and converted into a flame and
g) the resultant solids are separated off.

Figure 1:
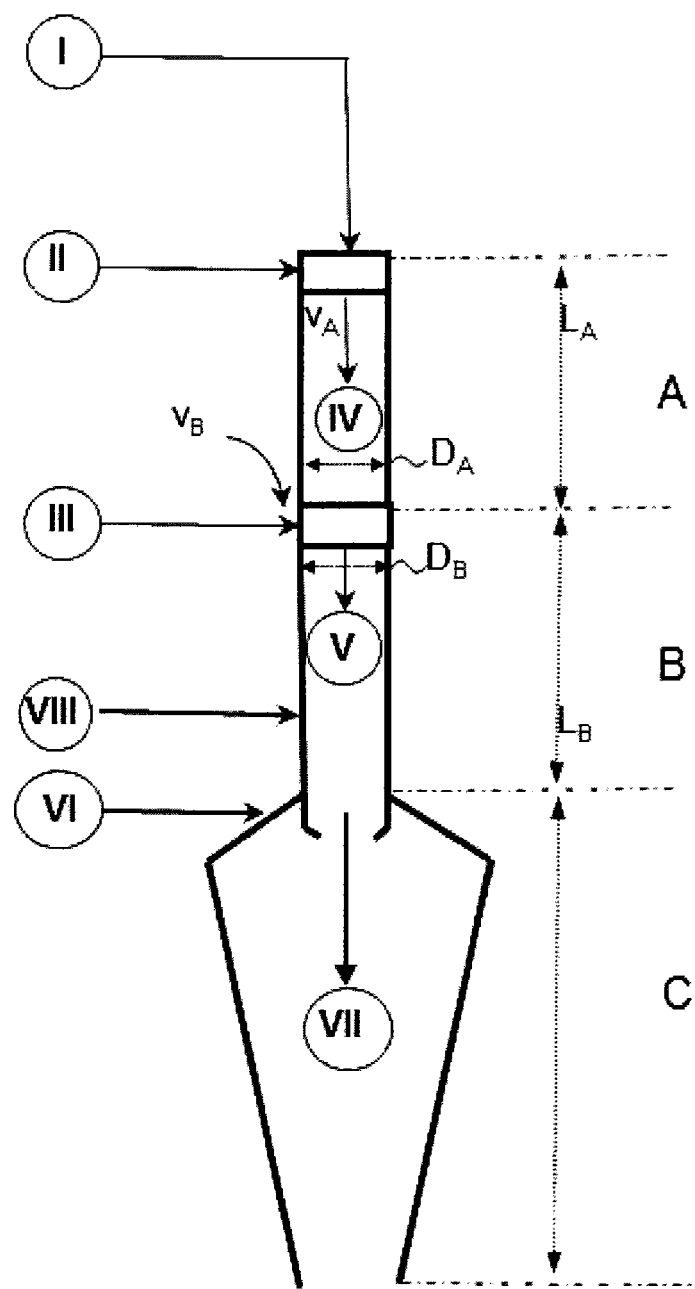
FIG. 1 shows schematically an embodiment of the invention.
Figure 1A:
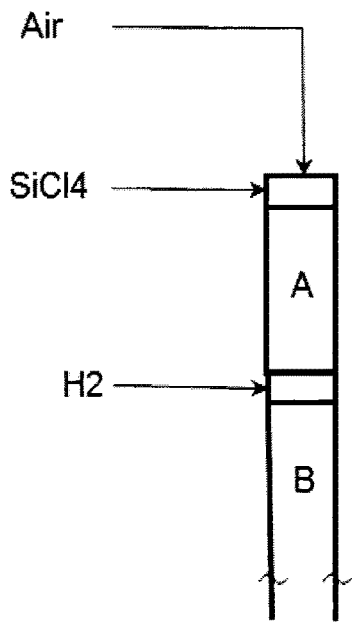
FIG. 1A shows the feed-in of the material stream I containing the metal compound, for example $SiCl_4$, into the pipe piece A comprising one or more static mixer elements.
Figure 1B:
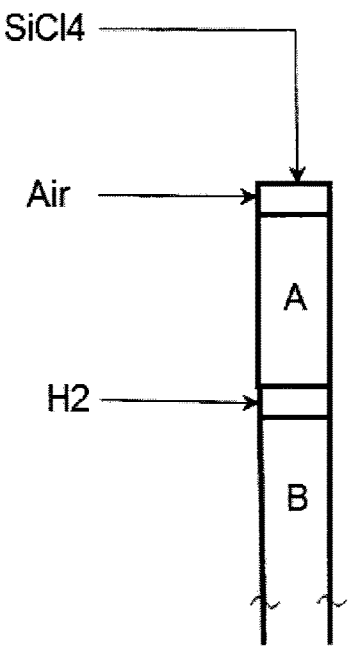
FIG. 1B shows the feed-in of the material stream II containing the oxygen into the pipe piece A comprising one or more static mixer elements.

FIG. 1 shows schematically this embodiment of the invention. In the drawings:
A, B=pipe piece A, or pipe piece B having the respective length L and the inner diameter D;
C=reaction chamber;
I-VIII=material streams;
material stream I containing at least one vaporous hydrolysable metal compound,
material stream II containing oxygen,
material stream III containing at least one fuel gas,
material stream IV is generated by introducing material stream I into material stream II or vice versa via a feed-in point provided in a pipe piece A comprising one or more static mixer elements,
material stream V is generated by introducing material stream III into material stream IV via a feed-in point provided in a pipe piece B comprising one or more static mixer elements,
material stream VI containing oxygen and/or steam,
material stream VII containing at least the reaction products metal oxide and water, optionally carbon dioxide and hydrochloric acid,
material stream VIII containing an aerosol obtained by atomizing a solution of a metal compound, FIGS. 1A and 1B show possible embodiments of this method of the invention with respect to material streams I to III. FIG. 1A shows the feed-in of the material stream I containing the metal compound, for example $SiCl_4$, into the pipe piece A comprising one or more static mixer elements. FIG. 1B shows the feed-in of the material stream II containing the oxygen into the pipe piece A comprising one or more static mixer elements. In both cases, the material stream III is fed into the pipe piece B comprising one or more static mixer elements.

In addition, the invention relates to a method for producing a metal oxide powder, in which Method for producing a metal oxide powder in which a) a material stream I containing at least one vaporous hydrolysable metal compound,
b) a material stream II containing at least one fuel gas and
c) a material stream III containing oxygen are brought to reaction, wherein
d) via a feed-in point provided in a pipe piece A, wherein the pipe piece A comprises one or more static mixer elements, the material stream I is introduced into the material stream II, or vice versa, and thereby generates the material stream IV, then
e) via a feed-in point provided in a pipe piece B, wherein the pipe piece B comprises one or more static mixer elements,
the material stream III is introduced into the material stream IV and thereby generates the material stream V,
f) the material stream V leaving the pipe piece B is introduced into a reaction chamber, ignited there and converted into a flame and
g) the resultant solids are separated off.

FIG. 1 shows schematically this embodiment of the invention. In the drawings:

A, B=pipe piece A, or pipe piece B, having the respective length L and the inner diameter D;
C=reaction chamber;
I-VIII=material streams;
material stream I containing at least one vaporous hydrolysable metal compound,
material stream II containing at least one fuel gas,
material stream III containing oxygen,
material stream IV is generated by introducing material stream I into material stream II or vice versa via a feed-in point provided in a pipe piece A comprising one or more static mixer elements,
material stream V is generated by introducing material stream III into material stream IV via a feed-in point provided in a pipe piece B comprising one or more static mixer elements,
material stream VI containing oxygen and/or steam,
material stream VII containing at least the reaction products metal oxide and water, optionally carbon dioxide and hydrochloric acid,
material stream VIII containing an aerosol obtained by atomizing a solution of a metal compound.

Figure 2A:
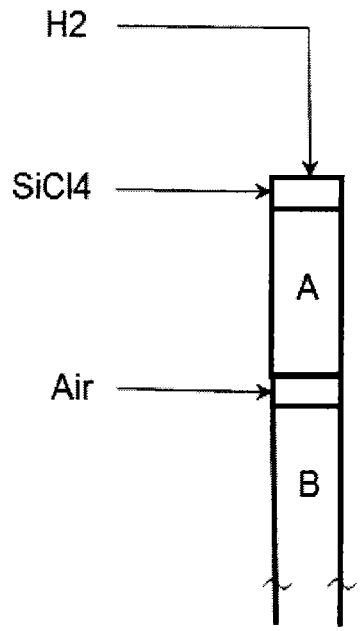
FIG. 2A shows the feed-in of the material stream I containing the metal compound, for example $SiCl_4$, into the pipe piece A comprising one or more static mixer elements.
Figure 2B:
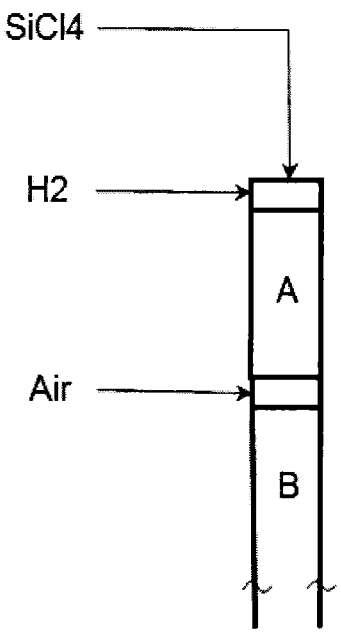
FIG. 2B shows the feed-in of the material stream II containing the fuel gas into the pipe piece A comprising one or more static mixer elements.

FIGS. 2A and 2B show possible embodiments of this method with respect to material streams I to III. FIG. 2A shows the feed-in of the material stream I containing the metal compound, for example $SiCl_4$, into the pipe piece A comprising one or more static mixer elements. FIG. 2B shows the feed-in of the material stream II containing the fuel gas into the pipe piece A comprising one or more static mixer elements. In both cases, the material stream III is fed into the pipe piece B comprising one or more static mixer elements.

Method for producing a metal oxide powder in which a) a material stream I containing oxygen,
b) a material stream II containing at least one fuel gas and
c) a material stream III containing at least one vaporous hydrolysable metal compound are brought to reaction, wherein
d) via a feed-in point provided in a pipe piece A, wherein the pipe piece A comprises one or more static mixer elements, the material stream I is introduced into the material stream II, or vice versa, and thereby generates the material stream IV, then
e) via a feed-in point provided in a pipe piece B, wherein the pipe piece B comprises one or more static mixer elements,
the material stream III is introduced into the material stream IV and thereby generates the material stream V,
f) the material stream V leaving the pipe piece B is introduced into a reaction chamber, ignited there and converted into a flame and
g) the resultant solids are separated off.

FIG. 1 shows schematically this embodiment of the invention. In the drawings:

A, B=pipe piece A, or pipe piece B, having the respective length L and the inner diameter D;
C=reaction chamber;
I-VIII=material streams;
material stream I containing oxygen,
material stream II containing at least one fuel gas,
material stream III containing at least one vaporous hydrolysable metal compound,
material stream IV is generated by introducing material stream I into material stream II or vice versa via a feed-in point provided in a pipe piece A comprising one or more static mixer elements,
material stream V is generated by introducing material stream III into material stream IV via a feed-in point provided in a pipe piece B comprising one or more static mixer elements,
material stream VI containing oxygen and/or steam,
material stream VII containing at least the reaction products metal oxide and water, optionally carbon dioxide and hydrochloric acid,
material stream VIII containing an aerosol obtained by atomizing a solution of a metal compound.

Figure 3A:
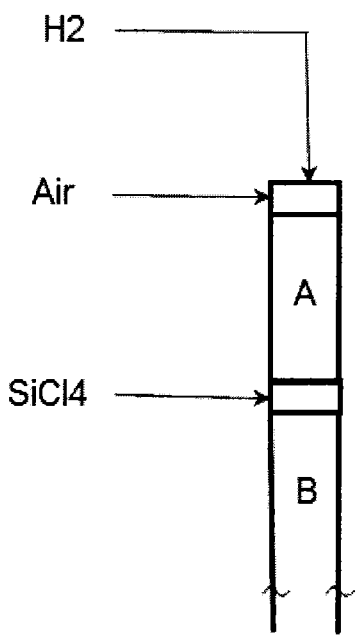
FIG. 3A shows the feed-in of the air-containing material stream I into the pipe piece A comprising one or more static mixer elements.
Figure 3B:
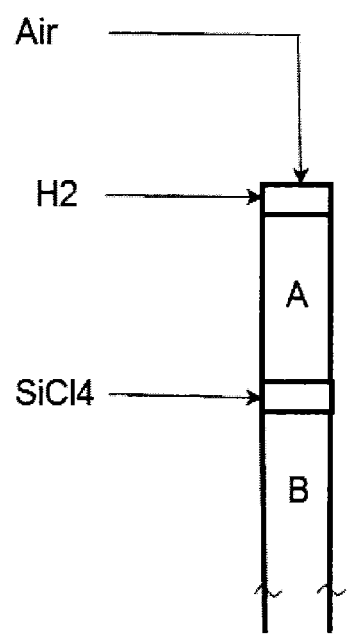
FIG. 3B shows the feed-in of the material stream II containing the fuel gas into the pipe piece A comprising one or more static mixer elements.

FIGS. 3A and 3B show possible embodiments of this method with regard to material streams I to III. FIG. 3A shows the feed-in of the air-containing material stream I into the pipe piece A comprising one or more static mixer elements. FIG. 3B shows the feed-in of the material stream II containing the fuel gas into the pipe piece A comprising one or more static mixer elements. In both cases the material stream III is fed into the pipe piece B comprising one or more static mixer elements.

The pipe piece A and/or B comprising the static mixer elements are what are termed static mixers, through which the material streams that are to be mixed flow. These are distinguished in that they effect the formation of secondary flows which extend over relatively large regions. In addition, turbulent regions are formed which lead to a finer mixing. In principle, the selection of the static mixer is not restricted. Examples of static mixers usable according to the present invention may be found, for example, in U.S. Pat. No. 4,758,098 or U.S. Pat. No. 5,522,661. In this case the pipe pieces A and B comprising the static mixer elements can be identical or different with respect to their dimensions and the type of mixer elements.

Preferably, however, flange mixers can be used in the method according to the invention, in which flange mixers mixing operations take place downstream of the static mixer elements. Such a flange mixer is disclosed, for example, in U.S. Pat. No. 5,839,828, in which the reaction stream that is to be fed is supplied via one or more orifice plates.

In EP-A-1153650, the reaction stream that is to be fed is introduced via a ring metering appliance having a particular flight arrangement.

Particularly preferably, the pipe pieces A and/or B can be constructed as flange mixers as disclosed in EP-A-1302236. These have the flight arrangement disclosed in EP-A-1153650, but instead of the ring metering appliance, a single isolated feed-in point is provided.

Very particular preference is given to an embodiment in which the static mixer disclosed in EP-A-1493485 is used. This is a static mixer having internals arranged in a pipe piece, which internals comprise flat, folded or curved flow barriers and also constrictions lying therebetween, wherein the primary flow barriers, on the surfaces thereof and/or on the edges thereof are geometrically modified, and via these modifications, in a first material stream, local second order flows are inducible, which are superimposed on the first order flow, and thus improve the mixing quality, namely in such a manner that radial and axial inhomogeneities in the fluid are equalized better than by the first order flow. The static mixer contains a feed-in point for a further material stream, which feed-in point opens out into a zone of the mixing region of the first material stream, in which the influence of the flow via the geometric modifications is particularly strongly developed. Explicit reference is made to FIG. 1 in EP-A-1493485.

In a particular embodiment of the invention, $L_A/D_A=2\text{-}20$, wherein $L_A$ is the length of the pipe piece A and $D_A$ is the inner diameter of the pipe piece A. Particular preference is given to an embodiment in which $L_A/D_A=3\text{-}6$.

In a further particular embodiment of the invention, $L_B/D_B=2\text{-}20$, wherein $L_B$ is the length of the pipe piece B and $D_B$ is the inner diameter of the pipe piece B. Particular preference is given to an embodiment in which $L_B/D_B=3\text{-}6$.

In a particular embodiment of the method according to the invention, the velocity $v_B$ with which the material stream III is introduced into the material stream IV is greater than the velocity $v_A$ of the material stream IV at the time point of the introduction of material stream III. Particular preference is given to an embodiment in which $v_B/v_A \geq 4$.

This applies with the proviso that the material stream I does not contain silicon compounds as sole metal compounds. For instance, silicon compounds can be used, for example in the production of mixed oxides, under the condition $v_B > v_A$. The velocity of material stream I and material stream II is not critical, provided that material stream I remains in the vaporous state. The measures therefor are known to those skilled in the art. As a general rule for the present invention, the velocity of the material stream which is introduced via the feed-in point of pipe piece A should be at least twice as high as the velocity of the other material stream.

$v_A$ is preferably at least 5 Nm/s. A range from 5 to 100 Nm/s has proved to be particularly suitable. $v_B$ is preferably at least 50 Nm/s. Particularly preferably, $100 \leq v_B \leq 1500$ Nm/s. The velocity details are normalized velocities. $v_A$ is given by dividing the volumetric flow rate having the unit $Nm^3/h$ by the cross-sectional area of the pipe piece A. $v_B$ results by dividing the volumetric flow rate having the unit $Nm^3/h$ by the cross-sectional area of the feed-in point.

In the context of the invention, volumes and velocities are stated in normalized form. In this case $Nm^3$ represents a volume at a pressure of 1.01325 bar and a temperature of 0° C. Nm/s represents a normalized velocity calculated from the volume and a cross-section.

Generally, the method according to the invention is carried out in such a manner that the amount of oxygen is at least sufficient in order to convert the metal compound and the fuel gas. In this case, lambda is greater than or equal to 1. Lambda describes the ratio of fed oxygen to stoichiometrically required oxygen.

The reaction equations $2H_2+O_2 \rightarrow 2H_2O$ and $SiCl_4+2H_2O \rightarrow SiO_2+4HCl$ from the example of the reaction of silicon tetrachloride and hydrogen as fuel gas allow the stoichiometrically required amount of oxygen to be traced. When other fuel gases and metal compounds are used, corresponding equations must be established. Gamma describes the ratio of fed hydrogen to stoichiometrically required hydrogen.

A material stream according to the present invention comprises at least one vaporous hydrolysable metal compound. Generally, the material stream further comprises a carrier gas, for example air, or an inert gas such as nitrogen.

A further material stream comprises oxygen. Generally, this is air or oxygen-enriched air.

A further material stream comprises or essentially consists of one or more fuel gases. These are preferably selected from the group consisting of hydrogen, methane, ethane and/or propane. Particular preference is given to hydrogen.

By means of the optional material stream VI, oxygen and/or steam can be introduced into the reaction chamber. The flame can be influenced thereby, and if necessary stabilized.

The material stream VII comprises at least the reaction products metal oxide and water. Depending on the structure of the metal compounds used and of the fuel gas, carbon dioxide and hydrochloric acid can be added.

The metal component of the vaporous hydrolysable metal compound used is preferably selected from the group consisting of Al, Be, Ce, Fe, Ge, In, Nb, Si, Sn, Ta, Ti, V, W, Zn and Zr. In the context of the invention, the semimetals Si and Ge are explicitly counted as among the metals. Particularly preferred metal components are Al, Si and Ti.

The vaporous hydrolysable metal compound used is preferably a chloride, a nitrate, a sulphate, an alkoholate, a carbonate, a carboxylate, an acetylacetonate, or a carbonyl. Particular preference is given to metal chlorides.

The method according to the invention also provides the production of mixed oxides, particularly preferably binary mixed oxides. For this purpose, mixtures of metal compounds corresponding to the desired fractions are used in the mixed oxide that is to be prepared. A mixed oxide is taken to mean a powder in which an intimate mixture of the components at the atomic level is present.

The method according to the invention additionally provides introducing a material stream VIII comprising an aerosol which is obtained by atomizing a solution of a metal compound into the material stream V which comprises the vaporous hydrolysable metal compound, oxygen and fuel gas. Depending on the metal compound and concentration thereof, mixed oxides are obtained in this manner in which the metal components are distributed very substantially homogeneously, or metal components introduced via aerosol are present to the greatest extent on the surface of the metal oxide which results from material stream V. The concentration of the metal components introduced via aerosol is preferably 0.01 to 20% by weight in the mixed oxide. This metal component is preferably one selected from the group consisting of K, Al, Si, P, Cu, Ag, Zn, Y, La, Ti, V, Mn, Fe, Co, Ru, Ce, Er and Yb. Very particular preference is given to K and Al.

Figure 1C:
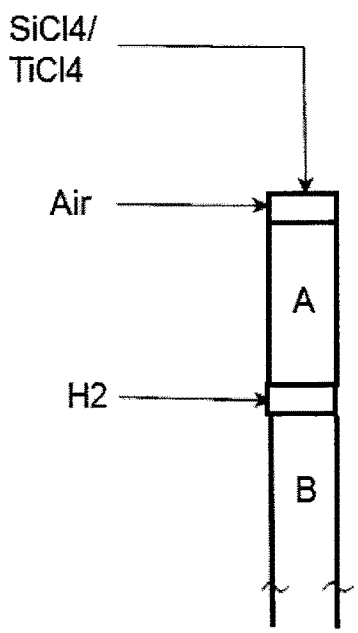
FIG. 1C shows the feed-in of the material stream II containing the oxygen into the pipe piece A comprising one or more static mixer elements.

FIG. 1C shows the feed-in of the material stream II containing the oxygen into the pipe piece A comprising one or more static mixer elements. By way of example, a mixture of $SiCl_4$ and $TiCl_4$ represents the material stream I containing the metal compound. As product, a silicon-titanium mixed oxide is obtained.

Figure 1D:
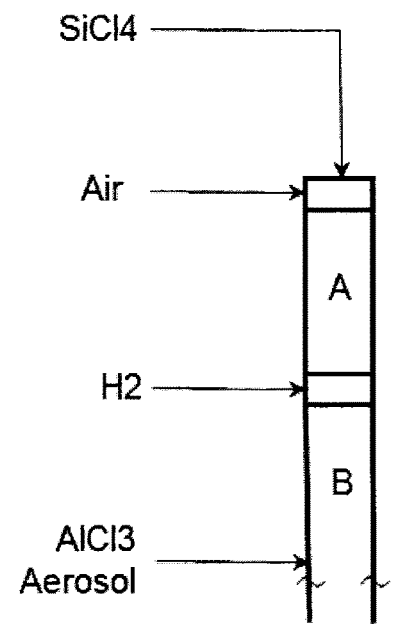
FIG. 1D shows the feed-in of a material stream VIII in the form of an aerosol containing $AlCl_3$.

FIG. 1D shows the feed-in of a material stream VIII in the form of an aerosol containing $AlCl_3$. The product obtained is a silicon-aluminium mixed oxide.

The method according to the invention can in addition be carried out in such a manner that a material stream VI containing oxygen and/or steam is conducted into the reaction chamber.

The method according to the invention can in addition be carried out in such a manner that the reaction mixture, after it leaves the reaction chamber, and before separation off of the solid, is cooled, preferably to temperatures of 80 to 250° C., and is subsequently treated with steam, preferably at temperatures of 350 to 750° C.

EXAMPLES

As pipe piece A and B comprising static mixer elements, CompaX mixers from Sulzer are used.

Example 1: The material stream I consisting of 5.4 kg/h of vaporous aluminium chloride having a velocity $v_I$ of 1.6 Nm/s is mixed via the isolated feed-in point having a diameter of 3 mm of a CompaX mixer A having $L_A/D_A=5$ into a material stream II consisting of 8.0 $Nm^3/h$ of air, which has a velocity $v_{II}$ of 314.4 Nm/s. The velocity $v_A$ is 16.1 Nm/s. By means of a CompaX mixer B having $L_B/D_B=5$, the isolated feed-in point of which has a diameter of 1 mm, to said material stream IV, a material stream III in the form of 2.50 $Nm^3/h$ of hydrogen are introduced. The velocity $v_B$ with which material stream III leaves the isolated feed-in point is 884.2 Nm/s. The resultant material stream V is introduced via a nozzle into a reaction chamber and ignited there. In addition, also, the material stream VI consisting of 22 $Nm^3/h$ of air is introduced into the reaction chamber. The resultant material stream VII which now contains aluminium oxide particles, hydrochloric acid, steam and air, is first cooled to a temperature of 120 to 150° C. Then, by means of a filter, the silica is separated off and it is treated with steam at a temperature of 400 to 500° C.

The aluminium oxide powder has a BET surface area of 128 $m^2/g$.

Example 2 is carried out in a similar manner.

Examples 3 to 5 show the production of mixed oxides. In Examples 3 and 4, the metal compounds are used as a mixture.

In Example 5, the method is carried out in such a manner that, as material stream VIII, an aerosol of a potassium chloride solution is used. The aerosol is prepared from a 5 percent strength aqueous potasisum chloride solution by means of ultrasonic atomization having an atomization performance of 200 g/h of aerosol. The aerosol is discharged from the vessel using 3.5 $Nm^3/h$ of air as carrier gas, which is conducted into the gas chamber of the vessel of the potassium chloride solution, and conducted through externally heated conduits, heated to 160° C., and introduced into the material stream V.

The respective operating settings may be found in the table.

The method according to the invention induces a very homogeneous mixing of the input materials and permits a stable process procedure which leads to very minor deviations in the product parameters.

TABLE

| Operating parameters and material properties | | | | | | |
|---|---|---|---|---|---|---|
| Example | | 1 | 2 | 3 | 4 | 5 |
| Material stream I | | $AlCl_3$ | $TiCl_4$ | $SiCl_4/TiCl_4$ | $AlCl_3/SiCl_4$ | $SiCl_4/KCl^{a)}$ |
| | kg/h | 5.4 | 3 | 8.0/0.2 | 0.9/8.7 | 8.0/0.01 |
| $v_I$ | Nm/s | 1.6 | 0.6 | 1.9 | 2.9 | 1.9 |
| Material stream II | | Air | Air | Air | Air | Air |
| | $Nm^3/h$ | 8 | 14 | 12.9 | 12.9 | 12.9 |
| $v_{II}$ | Nm/s | 314.4 | 550.2 | 506.9 | 506.9 | 506.9 |
| Material stream III | | $H_2$ | $H_2$ | $H_2$ | $H_2$ | $H_2$ |
| | $Nm^3/h$ | 2.5 | 2 | 3 | 2.6 | 4.2 |
| Material stream VI | | Air | Air | Air | Air | Air |
| | $Nm^3/h$ | 22 | 15 | 15 | 19 | 20 |
| $v_A$ | Nm/s | 16.1 | 25.9 | 25.2 | 26.1 | 25.2 |
| $v_B$ | Nm/s | 884.2 | 707.4 | 1061.0 | 919.6 | 1485.4 |
| $v_B/v_A$ | | 55.0 | 27.3 | 42.1 | 35.2 | 59.0 |
| λ | | 1.34 | 2.93 | 1.49 | 2.12 | 1.10 |
| Y | | 1.84 | 2.82 | 1.39 | 1.03 | 2.00 |
| Metal oxide | | $Al_2O_3$ | $TiO_2$ | $SiO_2/TiO_2$ | $Al_2O_3/SiO_2$ | $SiO_2/K_2O$ |
| | % by weight | 99.9 | 99.9 | 96.4/3.1 | 89.1/10.8 | 99.4/0.5 |
| BET | $m^2/g$ | 128 | 90 | 300 | 177 | 205 |

$^{a)}$KCl = material stream VIII

The invention claimed is:

1. A method for producing a metal oxide powder, the method comprising:

introducing a stream comprising a vaporous, hydrolysable metal compound into a stream comprising oxygen via a first feed-in point provided in a first pipe piece comprising one or more static mixer elements, or vice versa, to generate a first material stream;

introducing, at a velocity $v_B$, a stream comprising at least one fuel gas into the first material stream, which has a velocity $v_A$, via a second feed-in point provided in a second pipe piece comprising one or more static mixer elements, to generate a second material stream;

introducing the second material stream, which leaves the second pipe piece, into a reaction chamber to ignite the second material stream and to convert the second material stream into a flame, to obtain a mixture; and separating solids from the mixture,
wherein
$v_B$, which is at least 50 Nm/s, is greater than $v_A$, which is at least 5 Nm/s, with the proviso that the stream comprising the vaporous, hydrolysable metal compound does not comprise a silicon compound as the sole metal compound;

a $L_A/D_A$ ratio is 2-20, where $L_A$ is a length of the first pipe piece and $D_A$ is an inner diameter of the first pipe piece; and a $L_B/D_B$ ratio is 2-20, where $L_B$ is a length of the second pipe piece and $D_B$ is an inner diameter of the second pipe piece.

2. The method according to claim 1, wherein the first and second pipe pieces are each designed as a flange mixer.

3. The method according to claim 2, wherein the flange mixer comprises a single isolated feed-in point.

4. The method according to claim 1, wherein oxygen is at least sufficient in order to convert the vaporous, hydrolysable metal compound and the at least one fuel gas.

5. The method according to claim 1, wherein the vaporous, hydrolysable metal compound comprises a metal component selected from the group consisting of Al, Be, Ce, Fe, Ge, In, Nb, Si, Sn, Ta, Ti, V, W, Zn, and Zr.

6. The method according to claim 1, wherein the vaporous, hydrolysable metal compound is selected from the group consisting of a chloride, a nitrate, a sulphate, an alkoholate, a carbonate, a carboxylate, an acetylacetonate, and a carbonyl.

7. The method according to claim 1, further comprising:
introducing a stream comprising an aerosol of a metal compound into the second material stream.

8. The method according to claim 1, further comprising:
introducing a stream comprising oxygen and/or steam into the reaction chamber.

9. The method according to claim 1, further comprising:
cooling the mixture; and
steam-treating the solids.

10. The method according to claim 1, wherein the $L_A/D_A$ ratio is 3-6.

11. The method according to claim 1, wherein the $L_B/D_B$ ratio is 3-6.

12. The method according to claim 1, wherein a $v_B/v_A$ ratio is at least 4.

13. The method according to claim 1, wherein $v_A$ ranges from 5 to 100 Nm/s.

14. The method according to claim 1, wherein $v_B$ ranges from 100 to 1500 Nm/s.

* * * * *